G. J. FRITZ.
Doctor Engine.
No. 238,103. Patented Feb. 22, 1881.
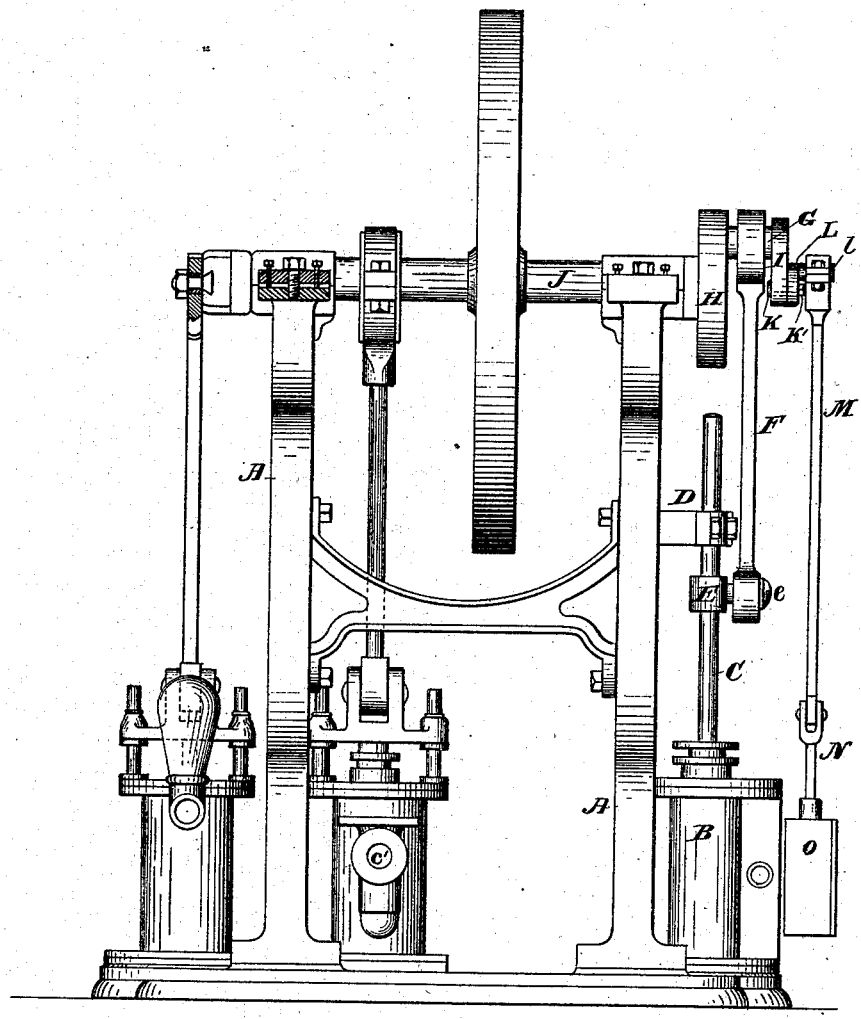

UNITED STATES PATENT OFFICE.

GEORGE J. FRITZ, OF ST. LOUIS, MISSOURI.

DOCTOR-ENGINE.

SPECIFICATION forming part of Letters Patent No. 238,103, dated February 22, 1881.

Application filed January 24, 1880.

*To all whom it may concern:*

Be it known that I, GEORGE J. FRITZ, a citizen of the United States, residing at St. Louis, in the State of Missouri, have invented a certain new and useful Improvement in Doctor-Engines, of which the following is a specification.

My improvement consists in combining with the wrist-pin and main-shaft crank a peculiar means for connecting them to the valve-stem, consisting of a crank-arm returning to the center line or axis of the main shaft and carrying at said center a pin on which is an eccentric-wrist, which is adjustable thereon by means of a set-screw, pin, key, or nut, and carries at its end a wrist-pin connecting with the pitman of the valve-stem of the engine, so that the lap and lead of the valve may be regulated by the adjustment of the said eccentric-wrist upon said axial pin.

In order that the invention may be fully understood, I will proceed to describe it with reference to the accompanying drawing, which represents a side view of an apparatus embodying my invention.

A is the frame of a doctor-engine. B is the steam-cylinder. C is the piston-rod. E is a collar, having a pin, e, which is jointed to the lower end of the connecting-rod F, the upper end of the rod being connected to the wrist-pin G of a crank, H, secured to the main shaft J. Outside the rod F the wrist-pin carries an arm, I, which returns to the axial line of the main shaft, at which point it is provided with a pin, K, extending outward on said line and carrying an eccentric-wrist, L, which may be adjusted thereon by a nut, K', or a set-screw, pin, or key, to regulate the motion of the valve. The wrist L has a wrist-pin, l, connected by a rod or pitman, M, with the stem N of the slide-valve working in the steam-chest O. The "play" of the valve depends on the distance of the pin l from the axis; but the lap and lead is adjusted by the eccentric-wrist on the pin K.

Having thus described my invention, the following is what I claim as new, and desire to secure by Letters Patent:

1. The arm I, pin K, in line with main shaft, eccentric-wrist L, mounted on said pin and rotatable thereon, and wrist-pin l, in combination with main shaft J, crank H, wrist-pin G, and rod M of the valve, as set forth.

2. The adjustable wrist L K', wrist-pin l, pin K, arm J, and wrist-pin G, in combination with the crank H, shaft J, and rod M, as set forth.

GEORGE J. FRITZ.

Witnesses:
GEO. H. KNIGHT,
RICHD. WEISEL.